United States Patent [19]

Nishida et al.

[11] Patent Number: 5,159,008
[45] Date of Patent: Oct. 27, 1992

[54] REINFORCED POLYPHENYLENE ETHER RESIN COMPOSITION

[75] Inventors: Koji Nishida; Yoshihiro Kurasawa; Suetsugu Kakiichi; Shohji Yoshino, all of Yokkaichi, Japan

[73] Assignee: Mitsubishi Petrochemical Co., Ltd., Tokyo, Japan

[21] Appl. No.: 691,724

[22] Filed: Apr. 26, 1991

[30] Foreign Application Priority Data

Apr. 26, 1990 [JP] Japan ................. 2-108698

[51] Int. Cl.⁵ ................. C08J 5/08; C08K 3/40; C08L 71/12
[52] U.S. Cl. ................. 524/494; 524/508; 524/538; 524/611
[58] Field of Search ................. 524/508, 611, 538, 494

[56] References Cited

U.S. PATENT DOCUMENTS

| | | | |
|---|---|---|---|
| 4,957,965 | 9/1990 | Taubitz et al. | 524/508 |
| 5,001,181 | 3/1991 | Takagi et al. | 524/280 |

FOREIGN PATENT DOCUMENTS 63-235362 9/1988 Japan.
26-9563 3/1990 Japan.

*Primary Examiner*—Paul R. Michl
*Assistant Examiner*—U. K. Rajguru
*Attorney, Agent, or Firm*—Oblon, Spivak, McClelland, Maier & Neustadt

[57] ABSTRACT

A thermoplastic resin composition comprising:
- 30 to 60 parts by weight of a polyphenylene ether which is a mixture of a high viscosity polyphenylene ether (A) with an inherent viscosity ($\eta A$) of 0.4 dl/g to 1.0 dl/g and a low viscosity polyphenylene ether (B) with an inherent viscosity ($\eta B$) of 0.25 dl/g to less than 0.4 dl/g at a weight ratio of (A)/(B) of 10/90 to 90/10 based on 100 parts by weight of the total of (A), (B) and (C),
- 40 to 70 parts by weight of a polyamide (C) with a relative viscosity ($\eta$) of 1.0 to 8.0 based on 100 parts by weight of the total of (A), (B) and (C),
- 0.1 to 10 parts by weight of a compound (F) having both of an unsaturated group and a polar group within the same molecule based on 100 parts by weight of the total of (A), (B) and (C),
- 5 to 100 parts by weight of mineral fillers and/or glass fibers (G) based on 100 parts by weight of the total of (A), (B) and (C), and
- 0 to 20 parts by weight of alkenyl aromatic polymer (D) based on 100 parts by weight of the total of (A), (B) and (C) and/or
- 0 to 50 parts by weight of an impact resistance improver (E) based on 100 parts by weight of the total of (A), (B) and (C), with the flow ratio represented by the ratio of the melt flow rate measured at 280° C., 5 kg load (MFR5) to the melt flow rate measured at 280° C., 2.16 kg load (MFR2) ($FR = MFR5/MFR2$) being 2.5 or more, and MFR5 30 or more, which composition is excellent in heat resistant rigidity and also markedly improved in molding processability.

18 Claims, 1 Drawing Sheet

REINFORCED POLYPHENYLENE ETHER RESIN COMPOSITION

BACKGROUND OF THE INVENTION

This invention relates to a thermoplastic resin composition excellent in heat resistant rigidity improved in molding processability, comprising a polyphenylene ether mixture and a polyamide mixture as a main component.

Thermoplastic resins can be improved in rigidity and heat resistance by filling with glass fibers. Also in the field of the so called engineering plastics, for example, when glass fibers are filled in a polyamide, the effects as mentioned above can be expected. However, when glass fibers are filled in a polyamide single substance, there still remains the problem that water absorption is great. On the other hand, when glass fibers are filled in a polyphenylene ether which is a representative engineering plastic, the drawbacks of inferior flowability, moldability remain as such. On the other hand, when glass fibers are filled in a resin composition comprising a polyphenylene ether and a polyamide, the composition obtained may be expected to be a material making avail of the advantages possessed by the respective polyphenylene ether, polyamide and glass fibers, namely having high rigidity, excellent solvent resistance as well as good molding processability. However, also in this case, no great improvement has been effected in the prior art concerning moldability, namely flowability. Particularly, in a thin molded product with a thickness of less than 0.4 mm, it has been found that short shot is really liable to occur in injection molding.

Thermoplastic resins of the prior art, despite the fact that rigidity at high temperature is excellent, involved the problem as mentioned above that molding processability is inferior. The present invention has improved this drawback and is intended to provide a thermoplastic resin excellent in heat resistant rigidity and also markedly improved in molding processability.

SUMMARY OF THE INVENTION

The present inventor has found that molding processability of a resin can be improved by combining high viscosity and low viscosity polyphenylene ethers and a polyamide to accomplish the present invention.

More specifically, the present invention provides a thermoplastic resin composition comprising:

30 to 60 parts by weight of a polyphenylene ether which is a mixture of a high viscosity polyphenylene ether (A) with an inherent viscosity ($\eta A$) of 0.4 dl/g to 1.0 dl/g and a low viscosity polyphenylene ether (B) with an inherent viscosity ($\eta B$) of 0.25 dl/g to less than 0.4 dl/g at a weight ratio of (A)/(B) of 10/90 to 90/10 based on 100 parts by weight of the total of (A), (B) and (C), 40 to 70 parts by weight of a polyamide (C) with a relative viscosity ($\eta$) of 1.0 to 8.0 based on 100 parts by weight of the total of (A), (B) and (C), 0.1 to 10 parts by weight of a compound (F) having both an unsaturated group and a polar group within the same molecule based on 100 parts by weight of the total of (A), (B) and (C), 5 to 100 parts by weight of mineral fillers and/or glass fibers (G) based on 100 parts by weight of the total of (A), (B) and (C), and 0 to 20 parts by weight of alkenyl aromatic polymer (D) based on 100 parts by weight of the total of (A), (B) and (C) and/or 0 to 50 parts by weight of an impact resistance improver (E) based on 100 parts by weight of the total of (A), (B) and (C), with the flow ratio (FR) represented by the ratio of the melt flow rate measured at 280° C., 5 kg load (MFR5) to the melt flow rate measured at 280° C., 2.16 kg load (MFR2) (FR=MFR5/MFR2) being 2.5 or more, and MFR5 being not less than 30 g/10 minutes.

DETAILED DESCRIPTION OF THE INVENTION

Constituent components

Figure 1:
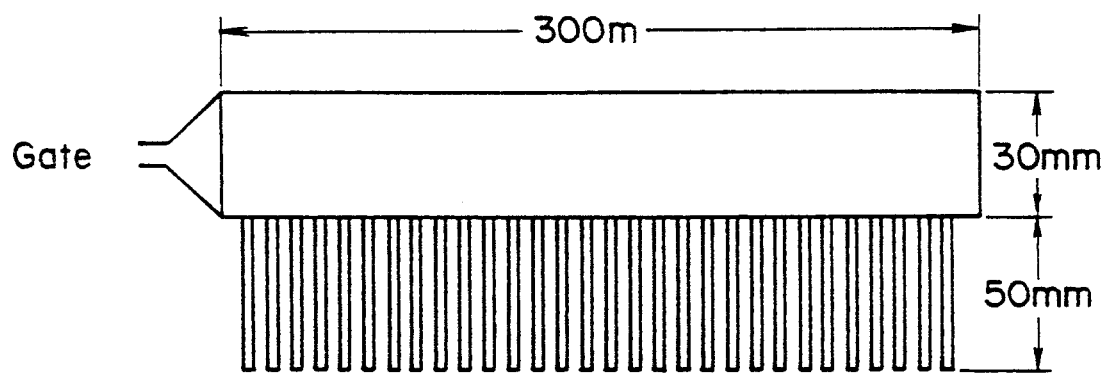
FIG. 1 is a plan view of the comb-shaped mold used for the test of molding processability.

The polyphenylene ether to be used in the present invention has a structural unit represented by the following formula:

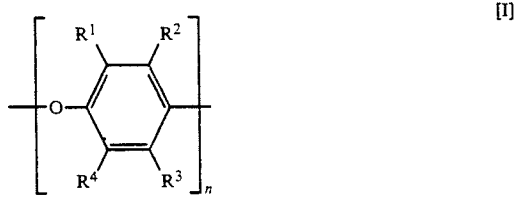

[I]

wherein n is at least 50, $R^1$, $R^2$, $R^3$ and $R^4$ each independently represent a monovalent substituent selected from the group consisting of hydrogen atom, halogen atoms, hydrocarbon groups containing no tertiary $\alpha$-carbon atom, halohydrocarbon groups substituted with a halogen atom substituted through at least two carbon atoms, hydrocarbonoxy groups, halohydrocarbonoxy groups substituted with a halogen atom through at least two carbon atoms.

Examples of the above hydrocarbon groups containing no tertiary $\alpha$-carbon atom may include lower alkyl groups such as methyl, ethyl, propyl, isopropyl, butyl and the like; alkenyl groups such as vinyl, allyl, butenyl, cyclobutenyl and the like; aryl groups such as phenyl, tolyl, xylyl, 2,4,6-trimethylphenyl and the like; aralkyl groups such as benzyl, phenylethyl, phenylpropyl and the like; and so on. Examples of the halohydrocarbon groups substituted with a halogen atom through at least two carbon atoms may include 2-chloroethyl, 2-bromoethyl, 2-fluoroethyl, 2,2-dichloroethyl, 2- or 3-bromopropyl, 2,2-difluoro-3-iodopropyl, 2-, 3-, 4- or 5-fluoroamyl, 2-chlorovinyl, chloroethylphenyl, ethyl(chloro)phenyl, fluoroxylyl, chloronaphthyl, bromobenzyl, and so on. Examples of hydrocarbonoxy groups may include methoxy, ethoxy, propoxy, butoxy, phenoxy, ethylphenoxy, naphtoxy, methylnaphthoxy, benzyloxy, phenylethoxy, tolylethoxy and the like. Examples of halohydrocarbonoxy groups substituted with a halogen atom through at least two carbon atoms may include 2-chloroethoxy, 2-bromoethoxy, 2-fluoroethoxy, 2,2-dibromoethoxy, 2- and 3-bromopropoxy, chloroethylphenoxy, ethyl(chloro)phenoxy, iodoxylyloxy, chloronaphthoxy, bromobenzyloxy, chlorotolylethoxy and the like.

The polyphenylene ether to be used in the present invention is also inclusive of copolymers of 2,6-dimethylphenol and 2,3,6-trimetylphenol, copolymers of 2,6-dimethylphenol and 2,3,5,6-tetramethylphenol, copolymers of 2,6-diethylphenol and 2,3,6-trimethylphenol and the like. Also, modified polyphenylene ethers such as the polyphenylene ether of [I] having grafted styrene type monomers (e.g. styrene, p-methylstyrene, α-methylstyrene and the like) grafted thereon, etc. may be also used.

The methods for preparing the polyphenylene ethers corresponding to those as described above are known in the art, as disclosed in U.S. Pat. Nos. 3,306,874, 3,306,875, 3,257,357 and 3,257,358, Japanese Patent Publication No. 17880/1977 and Japanese Unexamined Patent Publication No. 51197/1975.

The polyphenylene ether preferable for the purpose of the present invention is one having alkyl substituents at the ortho positions with respect to the ethereal oxygen atom and a copolymer of 2,6-dialkylphenol and 2,3,6-trialkylphenol.

The polyphenylene ethers to be used in the present invention have an inherent viscosity of 0.25 to 1.0 dl/g (measured at 30° C. in chloroform). Among them, the polyphenylene ether (A) has an inherent viscosity of 0.4 to 1.0 dl/g, and the same (B) an inherent viscosity of 0.25 dl/g to less than 0.4 dl/g, with the inherent viscosity of (A) being preferably 0.45 to 0.70 dl/g, particularly 0.46 to 0.56 dl/g, and that of (B) preferably 0.25 to 0.35 g/dl, particularly 0.30 to 0.35 dl/g.

Here, if the inherent viscosity of (A) exceeds 1.0 dl/g, flowability become extremely bad and polyphenylene ether is roughly dispersed in polyamide and therefore, a mechanical strength is lowered. Further, if the inherent viscosity of (B) is less than 0.25 dl/g, polyphenylene ether is similarly roughly dispersed in polyamide and a mechanical strength is extremely low, and therefore, the products are not practically invalid.

Next, the polyamide of the component (C) has —CO—NH— bonds in the polymer main chain and can be melted by heating. Representative examples are nylon-4, nylon-6, nylon-6,6, nylon-4,6, nylon-12, nylon-6,10, and otherwise, crystalline or amorphous polyamides containing monomeric components such as known aromatic diamines, aromatic dicarboxyic acids, etc. can be used. Here, amorphous polyamide refers to one in which substantially no crystallinity according to DSC exists.

Preferable polyamides (C) are nylon-6,6, nylon-6 and amorphous polyamides.

The polyamide (C) to be used in the present invention has a relative viscosity of 1.0 to 8,0 (measured at 25° C., in 98% conc. sulfuric acid, JIS K 6810), preferably 1.7 to 3.2. If the relative viscosity is less than 1.0, a mechanical strength is low and polyamide having the low molecular weight is volatiled to cause contamination of mold during molding, and the commercial value of the surface of the product is lowered. Further, if polyamide is also used of which polyamide the relative viscosity exceeds 8.0, its use is not preferable since the molecular weight is decreased reversibly during kneading or molding and deterioration of the appearance of the product is caused by water and a deteriorated substance generated by decomposition. The polyamide (C) is preferably one by use of a high viscosity polyamide and a low viscosity polyamide in combination.

One having a relative viscosity exceeding 4.0 is called high viscosity polyamide, one not higher than 4.0 low viscosity polyamide, and both are used in combination. The formulation ratio of high viscosity polyamide and low viscosity polyamide may be 90:10 to 10:90, preferably 80:20 to 20:80, particularly preferably 70:30 to 30:70, by weight.

Next, the alkenyl aromatic polymer of the component (D) is a homopolymer or copolymer with copolymerizable other vinyl monomers constituted of 50% by weight or more of an alkenyl aromatic monomeric unit represented by the following formula:

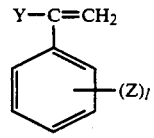

(wherein Y is hydrogen atom or an alkyl group having 1 to 4 carbon atoms, Z a halogen atom or an alkyl group having 1 to 4 carbon atoms, and zero or an integer of 1 to 3), which is improved in moldability, appearance. Specific examples of such alkenyl aromatic polymers may include polystyrene, polychlorostyrene, polybromostyrene, poly-α-methylstyrene, styrene-acrylonitrile copolymer, styrene-methyl methacrylate copolymer and the like, particularly preferably polystyrene.

The impact resistance improver of the component (E) to be used in the present invention is a rubbery substance intended for impact resistance improvement, which is a polyolefin type copolymer or a copolymer forming linking modes such as random, graft, block, etc. composed mainly of an alkenyl aromatic compound and a conjugated diene as the monomeric components, and may be also one containing partially a crosslinked structure, or one in which a part of the aliphatic unsaturate bonds derived from the conjugated diene are hydrogenated.

If these elastomers have too high tensile modulus, they are insufficient as impact resistance improver, and therefore the tensile modulus of the elastomer should be preferably 5000 kg/cm$^2$ (ASTM D-882) or less.

The alkenyl aromatic compound is preferably styrene, but lower alkyl-substituted styrene such as α-methyl-styrene, vinyltoluene and others, vinylnaphthalene, etc. may be also employed.

The conjugated diene is particularly preferably butadiene, but isoprene or one containing both of butadiene and isoprene may be also employed. Also, as the conjugated diene component, in addition to the above-mentioned butadiene, isoprene, cyclopentadiene and other derivatives, lower alkyl-substituted butadiene such as 2,3-dimethylbutadiene, etc. may be also contained.

Further, within the range which does not impair greatly the elastomeric properties of the copolymer, in addition to the above-mentioned diene components, olefinic hydrocarbons such as ethylene, propylene, 1-butene, etc. and non-conjugated dienes may be also contained.

A particularly preferable copolymer is a styrene-butadienestyrene triblock copolymer with a styrene content of 10% or more or its hydrogenated product, and of these one or a combination of two or more copolymers may be employed.

Also, there may be also employed these elastomers having α, β-unsaturated dicarboxylic acids such as maleic acid, monomethyl maleate, maleic anhydride, itaconic acid, monomethyl itaconate, itaconic anhydride, fumaric acid and the like, or alicyclic carboxylic acids such as endobicyclo[2.2.1]-5-hepten-2,3-carboxylic acid or derivatives of these grafted thereon by utilizing peroxides, ionized radiation, UV-ray, etc.

For example, it is possible to use α,β-unsaturated carboxylic acid modified ethylene-propylene copolymer, the same modified ethylene-butene copolymer, the same modified ethylene-propylene-third component ternary copolymer, the same modified ethylene-butene-third component ternary copolymer, the same modified acrylonitrile-butadiene elastomer, the same modified hydrogenated acrylonitrile butadien elastomer, the same modified partially crosslinked hydrogenated acrylonitrile elastomer, alkenyl aromatic compound-isoprene copolymer or/and hydrogenated product thereof.

Also, a core-shell elastomer having a crosslinked acrylic rubber for the core and an alkenyl aromatic polymer for the shell and/or its α,β-unsaturated carboxylic acid modified rubber, etc. may be enumerated, and in all of them, elastomers having a glass transition temperature of one component not higher than −10° C. are applied. Preferably, an elastomer having a glass transition point of −30° C. to −100° C. may be selected.

Next, the compound having an unsaturated group and a polar group within one molecule of the component (F) is a compound having an unsaturated group, namely carbon-carbon double or carbon-carbon triple bond, and a polar group, namely amide bond contained in polyamide resin, functional group exhibiting affinity for or chemical reactivity with carboxyl group, esters, amino group existing at chain terminals in combination within the same molecule. As such functional groups, there may included carboxyl groups of carboxylic acids, groups derived from carboxylic acid, namely various salts, esters, acid amides, acid anhydrides, imides, acid azides, acid halides in which hydrogen atom or hydroxyl group of carboxylic acid groups are substituted, or oxazoline, nitrile, epoxy group, amino group, hydroxyl group or isocyanates, etc. As the compound having an unsaturated group and a polar group in combination, there may be primarily employed unsaturated carboxylic acids, unsaturated carboxylic acid derivatives, unsaturated epoxy compounds, unsaturated alcohols, unsaturated amines, unsaturated isocyanates, etc.

Specifically, there may be included unsaturated dicarboxylic acids and derivatives thereof such as maleic anhydride, maleic acid, fumaric acid, maleinimide, maleic acid hydrazide, the reaction product of maleic anhydride with diamine, for example, having the structure represented by the following formula:

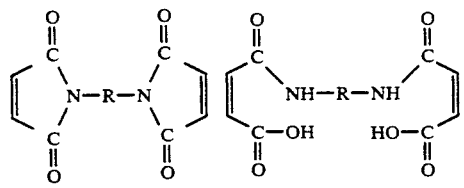

(wherein R represents an aliphatic group or an aromatic group), methylnadic anhydride, dichloromaleic anhydride, maleic acid amide, itaconic acid, itaconic anhydride and the like; natural oils and fats such as soybean oil, tung oil, castor oil, linseed oil, hempseed oil, cottonseed oil, sesame oil, rapeseed oil, peanut oil, camellia oil, olive oil, coconut oil, sardine oil, etc.; epoxidized natural oils and fats such as epoxidized soybean oil, etc.;

unsaturated carboxylic acids such as acrylic acid, butenoic acid, crotonic acid, vinylacetic acid, methacrylic acid, pentenoic acid, angelicaic acid, tibulic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethyl-crotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, micolipenoic acid, 2,4-pentadienic acid, 2,4-hexadienic acid, diallylacetic acid, geraniumic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapenta-enoic acid, tetracosenoic acid, hexacosenoic acid, hexacodienoic acid, octacosenoic acid, traacontenoic acid and the like; or esters, acid amides, anhydrides of these unsaturated carboxylic acids; or unsaturated alcohols such as allyl alcohol, crotyl alcohol, methylvinyl carbinol, allyl carbinol, methylpropenyl carbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by $C_nH_{2n-5}OH$, $C_nH_{2n-7}OH$, $C_nH_{2n-9}OH$ (where n is a positive integer), 3-butene-1,2-diol, 2,5-dimethyl-3-hexene-2,5-diol, 1,5-hexadiene-3,4-diol, 2,6-octadiene-4,5-diol and the like; or unsaturated amines with OH group of such unsaturated alcohols substituted with $NH_2$ group; or low molecular weight polymers of butadiene, isoprene, etc. (e.g., those having an average molecular weight of 500 to 10,000); or high molecular weight polymers (e.g., those having an average molecular weight of 10,000 or more) having maleic anhydride, phenols added or having amino group, carboxyl group, hydroxyl group, epoxy group, etc. introduced therein; allyl isocyanate; and so on.

In the definition of the compound having unsaturated group and polar group are included compounds containing 2 or more unsaturated groups and 2 or more polar groups (of the same kind or different kinds) as a matter of course, and it is also possible to use 2 or more kinds of compounds as the component (F). Among these, more preferable are unsaturated dicarboxylic acids such as maleic anhydride, maleic acid, itaconic anhydride, itaconic acid, etc. and anhydrides thereof, unsaturated alcohols such as oleyl alcohol, etc. epoxidized natural oils and fats, more preferably maleic anhydride, maleic acid, oleyl alcohol, epoxidized soybean oil, epoxidized linseed oil, above all preferably maleic anhydride and a mixture of maleic anhydride and maleic acid.

Next, for the mineral filler of the component (G), inorganic powder known per se as inorganic filler can be used. The inorganic filler has various shapes, including spherical, cubic, granular, needle, plate, fibrous and other shapes, and they are all available.

As such inorganic filler, there may be included single substances, oxides, hydroxides, carbonates, sulfates, silicates, sulfites of metal elements of the group I to group VIII of the periodic table (e.g. Fe, Na, K, Cu, Mg, Ca, Zn, Ba, Al, Ti) or silicon element, various clay minerals comprising these compounds, and others. Specific examples may include titanium oxide, zinc oxide, barium sulfate, silica, calcium carbonate, iron oxide, alumina, calcium titanate, aluminum hydroxide, magnesium hydroxide, calcium hydroxide, magnesium carbonate, calcium sulfate, sodium sulfate, calcium sulfite, calcium silicate, clay wallastonite, glass beads, glass powder, silica sand, silica, quartz powder, sandbar, diatomaceous earth, white carbon, iron powder, aluminum powder, etc. These may be used in combination of plural kinds.

These inorganic fillers may be also used as such without treatment, by for the purpose of enhancing affinity or interface binding force with the resin, they can be treated with inorganic surface treating agents, higher fatty acids or derivatives thereof such as esters, salts, etc. (e.g., stearic acid, oleic acid, palmitic acid, calcium stearate, magnesium stearate, aluminum stearate, stearic acid amide, ethyl stearate, methyl stearate, calcium oleate, oleic acid amide, ethyl oleate, calcium palmitate, palmitic acid amide, ethyl palmitate, etc.) and coupling agents (e.g., vinyltrimethoxysilane, vinyltriethoxysilane, vinyltriacetoxysilane, γ-chloro-propyltrimethoxysilane, γ-aminopropyl trimethoxysilane, γ-methacryloxypropyltrimethoxy -silane, β-(3,4-epoxycyclohexyl)ethyltrimethoxysilane, β-glycidoxypropyltrimethoxysilane, etc.); titanium coupling agents (e.g., isopropyltriisostearoyl titanate, isopropyltrilaurylmyristyl titanate, isopropylisostearoyldimethacryl titanate, isopropyltridiisooctyl phosphate titanate, etc.).

The glass fibers to be used in the present invention may be preferable those of 3 to 20 μm for further enhancing the physical properties balance (heat resistant rigidity, impact strength) as well as for further reducing molding warping deformation and reheating warping deformation. The glass fibers can be prepared according to, for example, the following method. First, molten glass is molded into glass beads of predetermined sizes called marbles, which are softened by heating in a filament collecting furnace called pushing, permit to flow down through a large number of nozzles of said furnace table and, while the base material is drawn at a high speed, it is sheafed by dipping with attachment of a sheafing agent by means of a sheafing agent coating device provided in the course thereof, followed by drying and wind-up on a rotatory drum. By controlling the nozzle diameter dimension and the take-up speed at this time and the take-up atmosphere temperature, etc., the average diameter of the glass fibers is made a predetermined dimension.

The length of said glass fibers is not particularly limited, but roving supply, chopped strands of about 1 to 8 mm, etc. are also preferable. The sheafing number in this case may be generally preferred to be 100 to 5000. Also, if the length in the polyamide after kneaded into the polyamide obtained is 0.1 mm or longer on an average, also a crushed product of strands called milled fiber, glass fiber, or a sliver of continuous monofilaments may be employed. The composition of the starting material glass may be preferably one free from alkali, and E glass may be mentioned as an example.

If the average diameter of glass fibers exceeds 20μ, the degree of improvement of mechanical strength becomes smaller, whereby the amount of molding warping becomes undesirably larger, while those with less than 3μ can be prepared with difficulty.

Here, the average diameter is measured by observation by an electron microscope, etc., and "average" indicates number average.

Here, the sheafing agent is constituted of film forming agent, surfactant, softening agent, antistatic agent, lubricant, etc., but only a surface treating agent may be employed.

In using these glass fibers, for the purpose of enhancing affinity or interface binding force with a resin, various coupling agents can be used. As the coupling agent, generally coupling agents of silane type, chromium type, titanium type, etc. are included. Among them, silane type coupling agents, including epoxy silanes such as γ-glycidoxypropyltrimethoxysilane, etc.; vinylsilanes such as vinyltrichlorosilane, etc.; aminosilanes such as γ-aminopropyltriethoxysilane, etc. may be preferably contained. In this case, it is preferable to effect at the same time the treatment with a dispersing agent such as various surfactants of nonionic, cationic and anionic type, fatty acid, metal soap, various resins for improvement of mechanical strength and kneadability.

Composition ratio of constituent components

As to the formulation ratios of the respective components contained in the resin composition of the present invention, the total amount of the components (A) and (B) may be 30 to 60 parts by weight, preferably 35 to 55 parts by weight, particularly 35 to 50 parts by weight, based on 100 parts by weight of the total amount of the components (A), (B) and (C). The ratio of (A)/(B) may be 10/90 to 90/10, preferably 20/80 to 80/20, particularly 30/70 to 60/40.

The inherent viscosities ($\eta_A$) and ($\eta_B$) should desirably satisfy the conditions of the following formula:

$$0.1 \leq \eta_A - \eta_B \leq 0.8$$

The component (C) may be 40 to 70 parts by weight, preferably, 45 to 65 parts by weight, particularly preferably, 50 to 65 parts by weight based on 100 parts by weight of the total amount of the components (A), (B) and (C).

The component (D) may be 0 to 20 parts, preferably 0.5 to 10 parts by weight, based on 100 parts by weight of the total amount of (A), (B) and (C), The component (E) may be 0 to 50 parts by weight, preferably 0.5 to 30 parts by weight, base on 100 parts by weight of the same total amount. The component (F) is 0.1 to 10 parts by weight, preferably 0.5 to 1.5 part by weight, particularly 0.9 to 1.1 parts by weight based on 100 parts by weight of the same total amount. The component (g) may be 5 to 100 parts by weight, preferably 15 to 80 parts by weight, particulary 20 to 80 parts by weight, based on 100 parts by weight of the same total amount.

If the total amount of the components (A) and (B) is less than 30 parts by weight based on 100 parts by weight of the total amount of (A), (B) and (C), the heat resistance of the final composition are unsatisfactory, while if it exceeds 60 parts by weight, the moldability and the impact strength of the final composition will be unsatisfactory. If the component (C) is not less than 40 parts by weight based on 100 parts by weight of the total amount of the components (A), (B) and (C), the moldability is not satisfactory, while if it exceeds 70 parts by weight, the heat resistance is not satisfactory. If the component (D) exceeds 20 parts by weight based on 100 parts by weight of the total amount of (A), (B) and (C), the heat resistant rigidity of the final composition will be unsatisfactory. If component (E) exceeds 50 parts by weight based on 100 parts by weight of the total amount of the components (A), (B) and (C), the heat resistance and the rigidity are insufficient. If component (G) is less than 5 parts by weight of the total amount of the components (A), (B) and (C), the rigidity and the heat resistance are insufficient, and if component (G) exceeds 100 parts by weight based on 100 parts by weight of the total amount of components (A), (B) and (C), the moldability becomes bad and the production of the products becomes difficult itself. If the component (F) is less than 0.1 part by weight based on 100 parts by weight of the same total amount, the impact resistance of the final composition is insufficient, while if it exceeds 10 parts by weight, drawbacks will occur in appearance of the molded product of the final composition. In the thermoplastic resin of the present invention, it is necessary that the flow ratio represented by the ratio of the melt flow rate measured at 280° C., 5 kg load (MFR5) to the melt flow rate measured at 280° C., 2.16 kg load (MFR2) (FR=MFR5/MFR2) is 2.5 or more, and MFR5 is 30 or more. If FR is less than 2.5 or MFR5 being not less than 30 g/10 minutes, the moldability is not satisfactory.

In the composition of the present invention, within the range which does not impair the object of the present invention, there can be added, if necessary, thermoplastic or thermosetting resins other than the polymer components as described above, antioxidants for rubber components, weathering resistance improvers, nucleation agents, slip agents, inorganic or organic fillers or reinforcing agents, flame retardants, various colorants, antistatic agents, mold release agents, etc.

Blending Method

The composition of the present invention can be prepared by use of a conventional kneading machine such as single screw extruder, twin screw extruder, Banbury mixer, rolls, Brabender plastograph, kneader, etc. Ordinarily, the composition is kneaded by an extruder to be formed into a compound shaped in pellets before provided for processing, but in a special case, all the components can be also fed directly into various molding machines and molded while kneading in the molding machines. Alternatively, the filler and other components (together with various additives, if necessary) can be also kneaded to high concentrations to form a masterbatch, which can be compounded or molded by blending separately while being diluted with other polymers, etc.

For blending of the filler component, there may be also employed the method in which the filler component is added subsequently while melting and kneading other polymer components, or also preferably roving supply of glass fibers, etc., or alternatively a composition of the polyamide and the filler component previously kneaded can be also used.

Also, in carrying out kneading, there may be employed the method in which mixing or partial graft bonding is effected according to such method as melting and kneading the polymers and the compound (F) having an unsaturated group and a polar group within the same molecule in the presence or non-presence of a peroxide or heating them in organic solvent.

Application of resin composition according to the present invention

The molding processing method of the composition of the present invention is not particularly limited, but it can be easily molded according to molding methods generally applicable to thermoplastic resins, namely extrusion molding, hollow molding, injection molding, sheet molding, heat molding, rotational molding, lamination molding, etc., and among them, injection molding is the most preferred. Because the composition has good mechanical properties, dimensional stability and flowability, it is suitable for uses such as electronic, electrical parts.

The present invention is described below by referring to Examples, but its scope is not limited at all by these.

EXAMPLES 1 TO 6 COMPARATIVE EXAMPLES 2 TO 3

Of the respective components shown in the Table, (A), (B), (F) and the amorphous nylon were thoroughly mixed in a Henschel mixer, then the mixture pelleted by means of TEX44 twin screw extruder produced by Nippon Seikosho, and while melting and kneading the pellets together with the components (C), (D), (E) by TEX44, chopped strands were fed in the course to form a composition, which was then extruded into strands and pelleted by a cutter.

COMPARATIVE EXAMPLE 1

Pellets were formed in the same manner as in the above Examples except for feeding component (G) in the course and kneading the other respective components shown in the table all at once.

Next, by use of these pellets, using a comb-shaped mold shown in FIG. 1 having 30 bars with a thickness of 0.35 mm and a length of 50 mm, the resin filling state when molded under the conditions of a constant metering (37 by Nikko J100SSIIA), an injection cylinder temperature of 285° C., an injection pressure of 1200 kg/cm², a filling rate of 0.55 sec was observed to determine the filling ratio. Here, the filling ratio:

Filling ratio=(bar length/50 mm)×100% was determined as an average of the respective 5 bars on the gate side and the end side and shown in the Table.

The respective components used were as follows:
(a) Polyphenylene ether (A)
Poly(2,6-dimethyl-1,4-phenylene)ether with an inherent viscosity ($\eta_A$) of 0.56 dl/g (30° C., in chloroform) produced by Mitsubishi Yuka.
(b) Polyphenylene ether (B)
Poly(2,6-dimethyl-1,4-phenylene)ether with an inherent viscosity ($\eta_B$) of 0.3 dl/g (30° C., in chloroform) produced by Mitsubishi Yuka.
(c) Polyamide (C)
Crystalline nylons:
High viscosity (Nylon-6 produced by Kanebo, MC161) $\eta$=6.8,
Medium viscosity (Nylon-6 produced by Kanebo, MC112L) $\eta$=2.5,
Low viscosity (Nylon-6 produced by Kanebo, MC100L), $\eta$=2.1.
Amorphous nylon:
(Novamid X21 S07 produced by Mitsubishi Kasei) $\eta$=2.1.

(d) Alkenyl aromatic polymer (D)

Polystyrene (Dialex HH200, produced by Mitsubishi Kasei Polytech).

(e) Alkenyl aromatic-conjugated diene copolymer (E)

Styrene-butadiene block copolymer (SBS produced by Nippon Gosei Gomu, TR2400).

(f) Compound having unsaturated group and polar group in the same molecule (F):

Commercially available maleic anhydride (reagent grade) was used.

(g) Filler (G)

Glass fibers with an average diameter of 10 μm and a length of 3 mm.

0 to 50 parts by weight of an impact resistance improver (E) based on 100 parts by weight of the total of (A), (B) and (C), 0.1 to 10 parts by weight of a compound (F) having both an unsaturated group and a polar group within the same molecule based on 100 parts by weight of the total of (A), (B) and (C), and 5 to 100 parts by weight of mineral fillers and/or glass fibers (G) based on 100 parts by weight of the total of (A), (B) and (C), with the flow ration (FR) represented by the ratio of the melt flow rate measured at 280° C., 5 kg load (MFR5) to the melt flow rate measured at 280° C., 2.16 kg load (MFR2) (FR=MFR5/MFR2) being

TABLE

| | Formulation amount (parts by weight) | | | | | | | | | Glass fibers fed in the course (G) 5) wt % | Bar flow Filling ratio % | | | |
|---|---|---|---|---|---|---|---|---|---|---|---|---|---|---|
| | Polyphenylene ether | | Polyamide (C) | | | | | | | | | | | |
| | | | Amorphous nylon | Crystalline nylon | | | | | | | | | | Flow |
| | (A) | (B) | $\eta = 2.1$ | $\eta = 6.8$ | $\eta = 2.5$ | $\eta = 2.1$ | (D) | (E) | (F) | Others | | Gate side | End side | MFR5 | ratio |
| Example 1 | 13.5 | 31.5 | 2.4 | | 26.3 | 26.3 | | | 1 | | 32 | 47 | 38 | 73 | 3.1 |
| 2 | 13.5 | 31.5 | 2.5 | 13.1 | | 39.4 | | | 1 | | 32 | 52 | 40 | 78 | 2.7 |
| 3 | 13.5 | 31.5 | 2.5 | 13.1 | | 39.4 | | | 1 | 1) 0.8 | 32 | 36 | 56 | 135 | 3.0 |
| 4 | 13.5 | 31.5 | 2.4 | | 26.3 | 26.3 | | | 1 | | 40 | 43 | 46 | 55 | 3.0 |
| 5 | 13.5 | 31.5 | 5.0 | | 50.0 | | 10 | | 1 | | 32 | 38 | 28 | 41 | 3.1 |
| 6 | 13.5 | 31.5 | 5.0 | | 50.0 | | | 10 | 1 | 2) 6.0 | 32 | 36 | 22 | 47 | 3.1 |
| Comparative example 1 | | 45 | 3.0 | | 52 | | | | 1 | 1) 3.0 | 30 | 10 | 60 | 343 | 2.1 |
| 2 | 13.5 | 31.5 | 5.0 | | 50 | | | | 1 | 3) 6.0 | 32 | 6 | 6 | 12 | 4.6 |
| 3 4) | 13.5 | 31.5 | 2.4 | | 26.3 | 26.3 | | | 1 | | 32 | 2 | 3 | 0.3 | 11 |

1) Flowability improver (produced by Harima Kasei, Harydimer 280)
2) Flowability improver (produced by Hoechst, PED-522)
3) Impact resistance improver (produced by Sumitomo Kagaku, Bondfast E)
4) Inherent viscosity: $\eta_A = 1.2$ d//g
5) % by weight based on all of the compositions From the evaluation results as described above, it can be understood that the thermoplastic composition of the present invention comprising a combination of two kinds each of polyphenylene ether and polyamide with higher viscosity and lower viscosity is remarkably improved in the molding processability.

The composition of the present invention is reinforced with inorganic fillers, has excellent heat resistant rigidity and also remarkably improved in processability as described above, and therefore it has wide uses and can be an industrially useful material.

What is claimed is:

1. A thermoplastic resin composition comprising:

30 to 60 parts by weight of a polyphenylene ether which is a mixture of a high viscosity polyphenylene ether (A) with an inherent viscosity ($\eta_A$) of 0.4 dl/g to 1.0 dl/g and a low viscosity polyphenylene ether (B) with an inherent viscosity $\eta_B$ of 0.25 dl/g to less than 0.4 dl/g at a weight ratio of (A)/(B) of 10/90 to 90/10 based on 100 parts by weight of the total of (A), (B) and (C), 40 to 60 parts by weight of a polyamide (C) with a relative viscosity ($\eta$) of 1.0 to 8.0 based on 100 parts by weight of the total (A), (B) and (C), 0 to 20 parts by weight of alkenyl aromatic polymer (D) based on 100 parts by weight of the total of (A), (B) and (C), 2.5 or more, and MFR5 being not less than 30 g/10 minutes.

2. A thermoplastic resin composition according to claim 1, wherein the polyphenylene ether is a poly(2,6-dimethyl-1,4-phenylene)ether, with $\eta_A$ being 0.45 dl/g to 0.70 dl/g, and $\eta_B$ being 0.25 dl/g to less than 0.35 dl/g.

3. A thermoplastic resin composition according to claim 1, wherein the formulation ratio (A)/(B) of the high viscosity polyphenylene ether (A) to the low viscosity polyphenylene ether (B) is 20/80 to 80/20.

4. A thermoplastic resin composition according to claim 1, wherein the polyamide (C) is a mixture of a high viscosity polyamide with a relative viscosity ($\eta$) exceeding 4.0 and a low viscosity polyamide with a relative viscosity ($\eta$) not higher than 4.0.

5. A thermoplastic resin composition according to claim 4, wherein the polyamide (C) contains an amorphous polyamide.

6. A thermoplastic resin composition according to claim 4, wherein the polyamide (C) is a nylon-6, comprising a high viscosity nylon-6 with a relative viscosity ($\eta$) exceeding 4.0 and a low viscosity nylon-6 with a relative viscosity ($\eta$) not higher than 4.0 in combination with a formulation ratio of 90:10 to 10:90.

7. A thermoplastic resin composition according to claim 6, wherein the polyamide (C) contains an amorphous polyamide.

8. A thermoplastic resin composition according to claim 1, wherein the component (E) is a copolymer comprising an alkenyl aromatic compound and a conjugated diene as the primary monomeric components, which is a copolymer including partially crosslinked structure, or including a part of the aliphatic unsaturated bonds derived from the conjugated diene which is hydrogenated.

9. A thermoplastic resin composition according to claim 1, wherein the component (E) is a copolymer comprising styrene and butadiene as the monomeric components or a hydrogenated product thereof.

10. A thermoplastic resin composition according to claim 1, wherein the component (F) is an unsaturated carboxylic acid.

11. A thermoplastic resin composition according to claim 1, wherein the component (F) is maleic anhydride.

12. A thermoplastic resin composition according to claim 1, wherein the component (G) is glass fibers with an average diameter of 3 to 20 $\mu$m.

13. A thermoplastic resin composition according to claim 1, wherein the component (G) is glass fibers which are chopped strands with an average diameter of 3 to 20 $\mu$m and a length of 1 to 8 mm.

14. A thermoplastic resin composition according to claim 1, wherein the respective inherent viscosities ($\eta_A$) and ($\eta_B$) satisfy the condition of:

$$0.1 \leq \eta_A - \eta_B \leq 0.8.$$

15. A thermoplastic resin composition according to claim 1, wherein $\eta_A$ is 0.45 dl/g to 1.0 dl/g and $\eta_B$ is 0.25 dl/g to less than 0.4 dl/g.

16. A thermoplastic resin composition according to claim 1, wherein $\eta_A$ is 0.45 dl/g to 0.7 dl/g and $\eta_B$ is 0.25 dl/g to less than 0.4 dl/g.

17. A thermoplastic resin composition according to claim 1, wherein $\eta_A$ is 0.46 dl/g to 0.56 dl/g and $\eta_B$ is 0.25 dl/g to less than 0.4 dl/g.

18. A thermoplastic resin composition according to claim 1, wherein $\eta_A$ is 0.46 dl/g to 0.56 dl/g and $\eta_B$ is 0.30 dl/g to 0.35 dl/g.

* * * * *